(12) United States Patent
Henry et al.

(10) Patent No.: US 8,354,170 B1
(45) Date of Patent: Jan. 15, 2013

(54) ELASTOMERIC MATRIX COMPOSITES

(75) Inventors: Christopher P. Henry, Thousand Oaks, CA (US); Geoffrey P. McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 600 days.

(21) Appl. No.: 12/587,469

(22) Filed: Oct. 6, 2009

(51) Int. Cl.
  *B32B 15/04* (2006.01)
  *B32B 15/08* (2006.01)
(52) U.S. Cl. ........................ 428/457; 428/458
(58) Field of Classification Search ............... None
  See application file for complete search history.

(56) References Cited

U.S. PATENT DOCUMENTS

| | | | |
|---|---|---|---|
| 5,368,930 A | 11/1994 | Samples | |
| 5,407,612 A | 4/1995 | Gould et al. | |
| 7,901,524 B1 | 3/2011 | McKnight et al. | |
| 8,071,171 B1 | 12/2011 | Doty et al. | |
| 2006/0192465 A1 | 8/2006 | Kornbluh et al. | |

OTHER PUBLICATIONS

U.S. Appl. No. 12/212,469, filed Sep. 17, 2008, entitled "Three-Dimensional (3D) Reinforcement Control in Composite Materials" Application and Office Actions.

U.S. Appl. No. 12/354,662, filed Jan. 15, 2009, entitled "Microstructured Reconfigurable Composite Material", Application and Office Actions.

*Primary Examiner* — Camie Thompson
(74) *Attorney, Agent, or Firm* — Christie, Parker & Hale

(57) ABSTRACT

An engineered microstructure composite having an elastic or elastomeric matrix with distributed rigid reinforcements. One embodiment of the invention provides an elastomeric composite including an elastomeric matrix, a plurality of rigid reinforcements embedded within the elastomeric matrix, and a plurality of attachments (or ligaments) connected to the reinforcements to interconnect the rigid reinforcements to each other. Here, in this embodiment, the elastomeric composite has a composite reversible strain limit greater than 3 percent (%) (or, in one embodiment, greater than 5%) due to kinematics of the rigid reinforcements interconnected by the attachments and embedded within the elastomeric matrix.

23 Claims, 13 Drawing Sheets

(8 of 13 Drawing Sheet(s) Filed in Color)

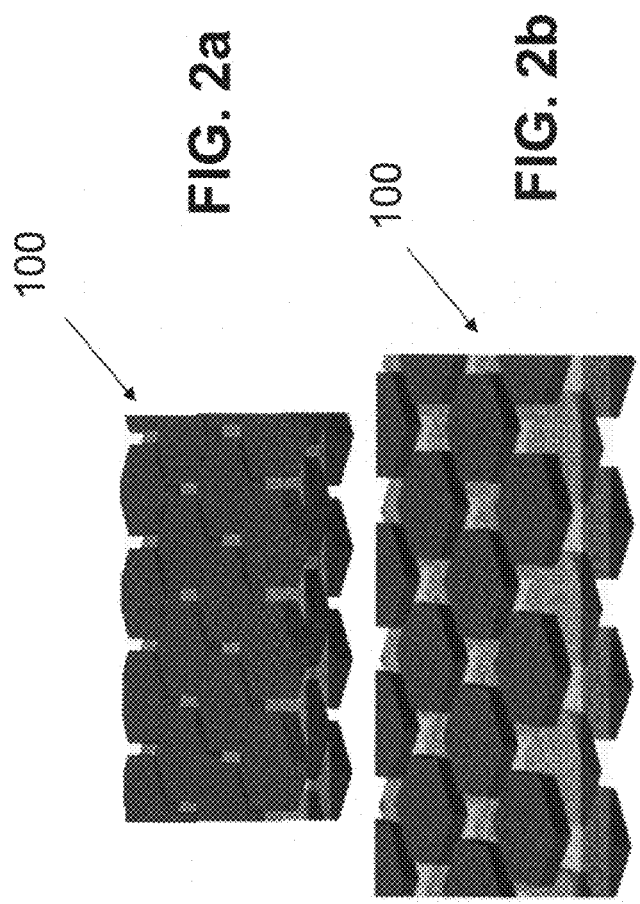

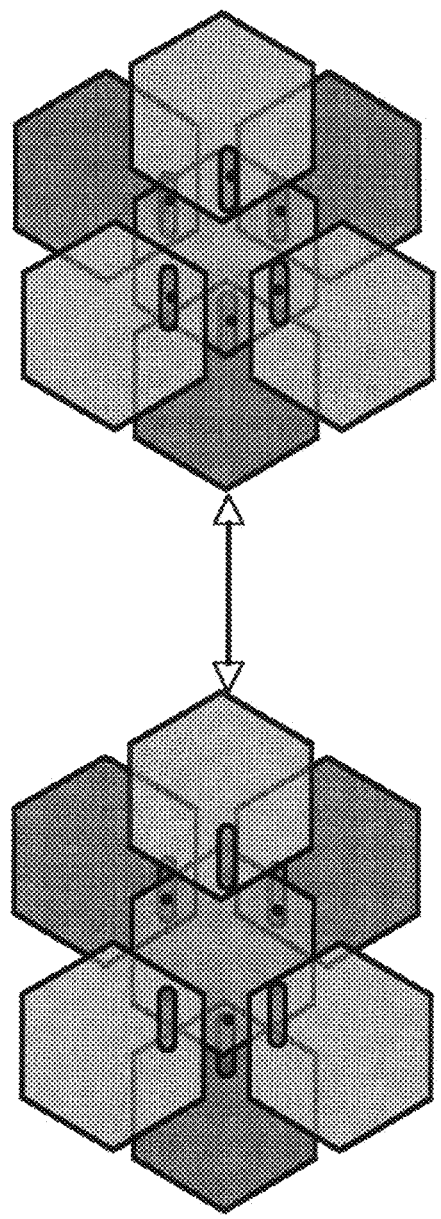

ELASTOMERIC MATRIX COMPOSITES

STATEMENT REGARDING FEDERALLY SPONSORED RESEARCH OR DEVELOPMENT

This invention was made with U.S. Government support under AFRL Contract No. FA8650-06-C-5059 awarded by the Air Force Research Laboratory (AFRL). The U.S. Government has certain rights to this invention.

FIELD OF THE INVENTION

The invention relates generally to an elastic or elastomeric matrix composite, and, more particularly, to an engineered microstructure composite having an elastic or elastomeric matrix with distributed rigid reinforcements.

BACKGROUND OF THE INVENTION

Current elastic matrix composites use either particulate reinforcement or fibrous reinforcement that limits the types and control of deformation that may be achieved. That is, these current elastic matrix composites do not generally provide the ability to engineer both stiffness and Poisson ratio (for the case of particulate fillers and fibrous fillers in particular). As such, there is a need for an engineered microstructure composite having an elastic or elastomeric matrix with distributed rigid reinforcements that can be configured to have almost any arbitrary levels of stiffness, to alter its Poisson ratio and allow unusual Poisson ratio, and to specially reinforce a particular direction within its materials without impacting the elasticity of other directions.

Potential applications that may require large deformations include seals, pressurized vessels, and variable geometry fairings, housings, wings, and fuel tanks. As such, these applications may benefit from such an engineered microstructure composite that can have variable size, volume, and directional deformation, while still resist application loadings, such as pressure. Other potential uses of this engineered microstructure composite (that can have variable size, volume, and directional deformation, while still resist application loadings, such as pressure) include hingeless flight control surfaces or other deformable surfaces.

Contrasting to traditional composites, which are generally strain limited, it is desired for a microengineered elastic composite that can be made to achieve large strains and area changes, and can be made to support bending strains which are poorly accommodated using elastomeric matrix fibrous composites. Contrasting to existing variable stiffness engineered composites, which take a long time to reach their highly deformable state, there is a need for an elastic composite that can be already in the highly deformable state.

As such, in view of the foregoing, there is a need for an engineered microstructure composite having an elastic or elastomeric matrix with distributed rigid reinforcements that can address the need for flexible composites in applications where traditional composite materials or existing elastic materials are inadequate.

SUMMARY OF THE INVENTION

Aspects of embodiments of the invention are directed toward engineered microstructure composites having an elastic or elastomeric matrix with distributed rigid reinforcements. An aspect of an embodiment of the present invention is to offer a method to create large deformation materials (with reversible axial or biaxial strain limit in excess of 3%, 5%, 10% or 20%-, e.g., an elastomeric matrix composition having a material characteristic of a reversible axial or biaxial strain limit greater than 3%, 5%, 10% or 20%) that can have tailorable stiffness and Poisson ratio properties. That is, current elastic matrix composite materials use either particulate reinforcement or fibrous reinforcement that limits the types and control of deformation that may be achieved. By contrast, an embodiment of the present invention utilizes engineered microstructures to manipulate the stiffness of the composite materials to almost any arbitrary level, to alter the Poisson ratio and allow unusual Poisson ratio, and to specially reinforce particular direction within the material without impacting the elasticity of other directions. In one embodiment, these desired material characteristics can be achieved by using a kinematically designed microstructure that uses either direct load carrying ligaments, or shear stress from overlapping regions to control the stiffness properties. The same kinematics can also be used to control the Poisson ratio or more generally strain coupling within the material.

More specifically, in an embodiment of the present invention, an elastomeric composite is provided. The elastomeric composite includes an elastomeric matrix having a Poisson ratio between 0.45 and 0.5, a modulus of elasticity between 460 KPa and 300 MPa, and a glass transition temperature at least 20 degrees Celsius below the deformation temperature of the elastomeric composite, a plurality of rigid reinforcements with major dimensionless than 1 cm and embedded within the elastomeric matrix, and a plurality of attachments (or ligaments) connected to the reinforcements to interconnect the rigid reinforcements to each other. Here, in this embodiment, the elastomeric composite has a composite reversible biaxial strain limit greater than three (3) percent (%) due to kinematics of the rigid reinforcements interconnected by the attachments and embedded within the elastomeric matrix.

In one embodiment, the elastic composite reversible uniaxial strain limit is greater than five (5) percent (%) due to the kinematics of the rigid reinforcements 110 interconnected by the attachments and embedded within the elastomeric matrix.

In one embodiment, the elastomeric composite comprises interconnected rigid reinforcements embedded within an elastomeric matrix which has a controlled connectivity in-plane and between layers of the rigid reinforcements.

In one embodiment, the attachments and the rigid reinforcements are joined in three dimensions. In-plane ligaments join the edges of the reinforcements. Thickness-direction ligaments join the top and bottom surfaces of nearest or next nearest neighbor reinforcements. Thickness-direction ligaments can alternatively join in-plane ligaments together, not to the reinforcements directly.

In one embodiment, the elastomeric composite is configured by the interconnected rigid reinforcements embedded within the elastomeric matrix for an in-plane anisotropic reversible deformation limit greater than 3 percent (%) uniaxial strain of the elastomeric composite.

In one embodiment, the elastomeric composite is configured by the interconnected rigid reinforcements embedded within the elastomeric matrix for an out-of-plane anisotropic reversible deformation limit greater than 3 percent (%) strain of the elastomeric composite.

In one embodiment, the elastomeric matrix is composed of a single elastomer.

In one embodiment, the elastomeric matrix is composed of a first elastomer having a Poisson ratio between 0.45 and 0.5, a modulus of elasticity between 460 KPa and 300 MPa, and a glass transition temperature 20 degrees Celsius below the deformation temperature of the elastomeric composite, and a second elastomer having a Poisson ratio between 0.45 and 0.5 and a modulus of elasticity between 460 KPa and 300 MPa, the second elastomer differing in physical and/or chemical properties from the first elastomer.

In one embodiment, the elastomeric matrix is composed of an elastomer and a shape memory polymer (SMP).

In one embodiment, the elastomeric composite is an impermeable composite.

In one embodiment, the elastomeric composite is configured by the interconnected rigid reinforcements embedded within the elastomeric matrix to have spatial and depth control of structural responses.

In one embodiment, the elastomeric composite is configured by the interconnected rigid reinforcements embedded within the elastomeric matrix such that it is electrically continuous.

In one embodiment, the rigid reinforcements interconnected by the attachments and embedded within the elastomeric matrix are configured to have a shape of a pressure vessel (see, e.g., FIG. 6) or an aeronautical wing (see, e.g., FIG. 7).

In one embodiment, the attachments and the reinforcements are composed of a constant stiffness material.

In one embodiment, the reinforcements and the attachments are cut, machined, etched or stamped out of a sheet or foil of structural material.

In one embodiment, the rigid reinforcements and the attachment are composed of metal or metal alloy. Here, the metal or metal alloy is usually selected from the group consisting of aluminum, steel, titanium, nickel, cobalt, copper brass, bronze, magnesium, molybdenum, tungsten, other transition metal or actinide series elements and combinations thereof. Other rigid reinforcements materials may be used such as fiberglass composites, carbon fiber-based composites, silicon carbide-based composites, alumina-based composite materials and other structural ceramics and their composites.

Ligaments, flanges, posts and the like may be joined via a number of techniques, not limited to adhesion, diffusion bonding, chemical vapor deposition, brazing, welding, interference fits and mechanical interlocks.

Multi-layer reinforcement perform comprising the above joined individual layers is infiltrated with an elastomeric matrix via impregnation, vacuum assisted resin transfer molding, extrusion, protrusion, liquid casting, etc. and cured in-place.

In an embodiment of the present invention, an elastomeric composite is provided. The elastomeric composite includes a plurality of rigid reinforcement layers and a plurality of elastomeric layers arranged in alternating layers with the plurality of rigid reinforcement layers. Each of the rigid reinforcement layers includes an elastomeric material, a plurality of rigid reinforcements embedded in the elastomeric material 120, and a plurality of in-plane attachments to interconnect the rigid reinforcements (see, e.g., FIG. 4). Each of the elastomeric layers includes the elastomeric material and a plurality of out-of-plane attachments. The out-of-plane attachments interconnect the rigid reinforcements of the plurality of rigid reinforcement layers to each other (see, e.g., FIG. 3).

In one embodiment, the in-plane and out-of-plane attachments and the reinforcements are composed of a constant stiffness material.

In one embodiment the attachments and reinforcements are different materials.

In one embodiment, the elastomeric composite has a composite reversible strain limit of greater than three percent (3%) due to kinematics of the rigid reinforcements interconnected by the in-plane and out-of-plane attachments and embedded within the elastomeric material.

In one embodiment, the rigid reinforcements in each of the rigid reinforcement layers are reinforcement platelets etched out of a structural sheet or foil.

In one embodiment, the rigid reinforcements and the in-plane and out-of-plane attachments are composed of metal or metal alloy. Here, the metal or metal alloy may be selected from the group consisting of aluminum, steel, titanium, nickel, cobalt, copper brass, bronze, magnesium and combinations thereof.

In one embodiment, the elastomeric material is a natural and/or synthetic rubber material.

A more complete understanding for the elastomeric matrix composites will be afforded to those skilled in the art, as well as a realization of additional enhancements thereof, by a consideration of the following detailed description. Reference will be made to the appended sheets of drawings, which will first be described briefly.

BRIEF DESCRIPTION OF THE DRAWINGS

The accompanying drawings, together with the specification, illustrate exemplary embodiments of the present invention, and, together with the description, serve to explain the principles of the present invention.

The patent or application file contains at least one drawing/picture executed in color. Copies of this patent or patent application publication with color drawing/picture(s) will be provided by the Office upon request and payment of the necessary fee.

FIGS. 2*a* and 2*b* illustrate how the spacing and rigid body kinematics occurs as the elastomeric composite of FIGS. 1*a*, 1*b*, and 1*c* is stretched.

FIGS. 10*a* and 10*b* illustrate that suitable slots and pins may be used to cause directional anisotropic deformation.

DETAILED DESCRIPTION

Figure 1A:
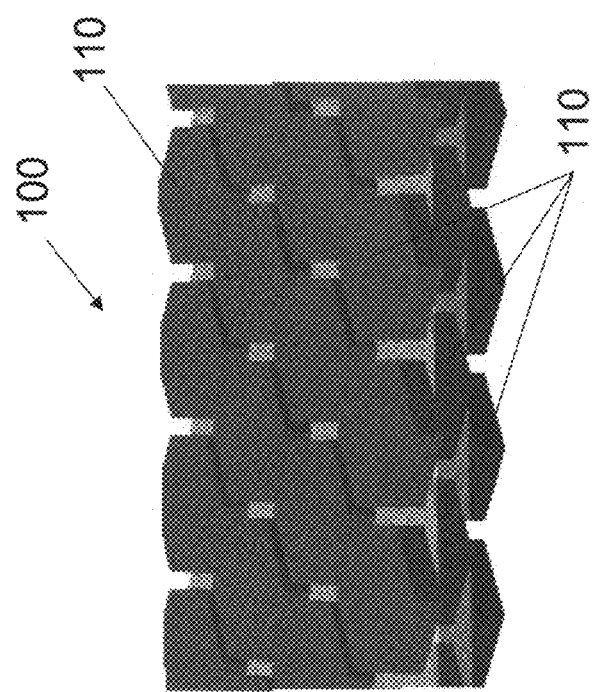
FIGS. 1*a*, 1*b*, and 1*c* respectively are a perspective view, a top plan view, and a cross-sectional view of a simplified illustration of an elastomeric composite 100 according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Embodiments of the present invention provide engineered microstructure composites having an elastic or elastomeric matrix with distributed rigid reinforcements. In one embodiment of the present invention, a method is provided to create large deformation materials (with uniaxial or biaxial strain limit in excess of 3%) that can have tailorable stiffness and Poisson ratio properties. That is, current elastic matrix composite materials use either particulate reinforcement or fibrous reinforcement that limits the types and control of deformation that may be achieved. By contrast, an embodiment of the present invention utilizes engineered microstructures to manipulate the elastic strain in certain directions of the composite. Additionally, stiffness and Poisson ratio may be tailored within the material without impacting the elasticity of other directions. In one embodiment, these desired material characteristics can be achieved by using a kinematically designed microstructure that uses either direct load carrying ligaments in-plane or posts in the thickness direction, or shear stress from overlapping regions to control the stiffness properties. The same kinematics can also be used to control the Poisson ratio or more generally, the directional strain coupling within the material.

As envisioned, embodiments of the present invention address the need for flexible composites in applications where traditional composite materials or existing elastic materials are inadequate. That is, engineered microstructure composites according to embodiments of the present invention will provide large strain capacity (3-100% uniaxial or biaxial strain) while still allowing some measure of stiffness control. Furthermore, in the engineered microstructure composites according to the embodiments of the present invention, the Poisson ratio may be adjusted as needed to maintain connectivity with external boundaries for example. Current materials do not generally provide the ability to engineer both stiffness and elastic strain (for the case of particulate fillers and fibrous fillers in particular). Potential applications that may require large deformations include seals, vehicle body panels, pressurized vessels, variable geometry fairings, housings, wings, fluid control surfaces and fuel tanks. They may benefit from variable size, volume, and directional deformation, but still resist application loadings, such as hydrostatic pressure or aerodynamic pressure. Other potential uses include hingeless flight control surfaces or other shape-, area- or volume-sensitive surfaces.

Contrasting to traditional composites, which are generally strain limited, these new microengineered elastic composites according to embodiments of the present invention can be made to achieve large strains, and can be made to support bending strains which are poorly accommodated using elastomeric matrix fibrous composites. Contrasting these materials with existing variable stiffness engineered composites, the purely elastomeric matrix composites in certain embodiments of the present invention can be provide fast elastic response at the cost of overall stiffness.

In more detail, embodiments of the present invention integrate (via patterning, etching, and composite fabrication techniques) reinforcements into highly elastic/rubber/elastomeric materials, from here on referred to as elastic composites. Other reinforcement fabrication techniques include cutting, etching stamping, and joining techniques include adhesion, brazing, diffusion bonding, chemical vapor deposition, welding, interference fit and mechanical interlock. The purpose of these composites is to: (1) increase stiffness and strain in certain directions; (2) preventing wrinkling and buckling; (3) preventing stress concentrations with attached boundaries; (4) supporting directional application loads; (5) high speed deformation in the composite; and/or (6) creating an impermeable high deformation structure.

As envisioned, an elastomeric composite according to an embodiment of the present invention addresses a need where at least two structures need to be bridged. Examples are gaps, seams, etc. The composite according to one embodiment is designed to bare load in at least one direction while its boundary conditions are not fixed in space. More specifically, embodiments of the present invention are applicable in the areas, such as seals, tanks, aerodynamic control surfaces on automobiles, flight control surfaces, housings, tanks, seals, wings, engine fairings, inlet/outlet nozzles, aero-surfaces, etc.

As envisioned, a seal bridges the gap between two surfaces (car door, control flap, aero-surfaces) and is a prime example of an application that can be enhanced from an embodiment of the present invention. The elastomeric composite of an embodiment of the present invention would span the gap between the main housing and the opening by being attached at both sides. When either side moves the elastomeric composite stretches across the gap. Reinforcements help aide the application loads, accommodate differential thermal expansion between components, or specify how the seal should deform. In the extreme case, a highly engineered seal may be a part of the hinge.

Another exemplary application is aerodynamic pressure loading on wings, body panels, fluid tanks and inlet/outlet nozzles. Here, an elastomeric composite according to an embodiment of the present invention is engineered to resist perpendicular pressure loading but easily permit in-plane axial or areal (biaxial) deformation.

Embodiments of the present invention are related to, for example, U.S. Provisional Application No. 60/973,004 and U.S. patent application Ser. Nos. 11/193,148; 11/347,505; 11/839,764; and 11/974,134 in the area of engineered microstructures for variable stiffness composites materials, which are each assigned to the same assignee as the present invention and are each incorporated by reference herein in its entirety. However, instead of using variable stiffness composite materials, an embodiment of the present invention utilizes a non-variable stiffness elastomeric matrix, and is already in the highly deformable state and can be used for high deformation rate applications and timely deformation is necessary.

Here, in one embodiment of the present invention, the elastomer properties of the non-variable stiffness elastomeric matrix has a Poisson ratio between 0.45 and 0.5, a modulus of elasticity between 460 KPa and 300 MPa, and a glass transition temperature at least 20 degrees Celsius below the deformation temperature of the elastomeric composite.

In more detail, an embodiment of the present invention is different than variable stiffness composite materials due to the inclusion of highly elastic matrix materials and complements a suite of tailorable composite materials. That is, an elastomeric composite according to an embodiment has the ability to connect separate layers of planar reinforcements and helps give the composite load carrying capability and deformation tailoring. In one embodiment, the elastomeric composite is used in applications where elastic deformations are required to have a fast response time. In one embodiment, it can be envisioned that the two materials' variable stiffness and elastic can be used in a hybrid approach and extend the functionality of both materials.

An embodiment of the present invention is an elastomeric matrix composite in which the reinforcement material (composed of metallic, ceramic, or amorphous materials) is embedded. Here, the elastomeric matrix is a "stretchy" rubber material that does not require activation and thus can be deformed much more quickly. Furthermore, in some embodiments of the present invention, the reinforcements are not segmented/discrete platelets but rather have been joined together in at least one direction in the same plane. This connectivity between platelets can be used to transfer loads from one attachment boundary to another in the system. It is envisioned that platelets can also be connected in more than one direction in the same plane and out of plane to provide tailorable reinforcement materials for applications where variable stiffness is not needed.

As envisioned, embodiments of the present invention address the need for flexible composites in applications where traditional composite materials and/or newer smart composite materials fall short. In the case of traditional composites which are rigid, for example, a fiber glass composite material which is designed to bear load through both the matrix and the reinforcement and allow minimal flexure but mainly used to maintain its shape, and, in the case of newer smart composites, which are designed to provide similar functions as the traditional composites as well as allow large deformations when needed by "unlocking" (reducing stiffness) of the composite, move the boundary conditions and then "lock" (increase the stiffness) of the composite again. By contrast, an elastomeric composite according to an embodiment of the present invention is designed to allow large deformations while maintaining structural rigidity in at least one dimension. The purpose and enhancement of such composites of embodiments of the present invention are in applications that have consistently very directional loadings and need to achieve large deformations within shorter time periods than the "unlock-move-lock" procedure for the variable stiffness composites. Such applications may be seals, pressurized vessels, fairings, housings, wings and fuel tanks. They may benefit from larger size, volume and directional deformation, but still resist application loadings, such as pressure.

Figure 1B:
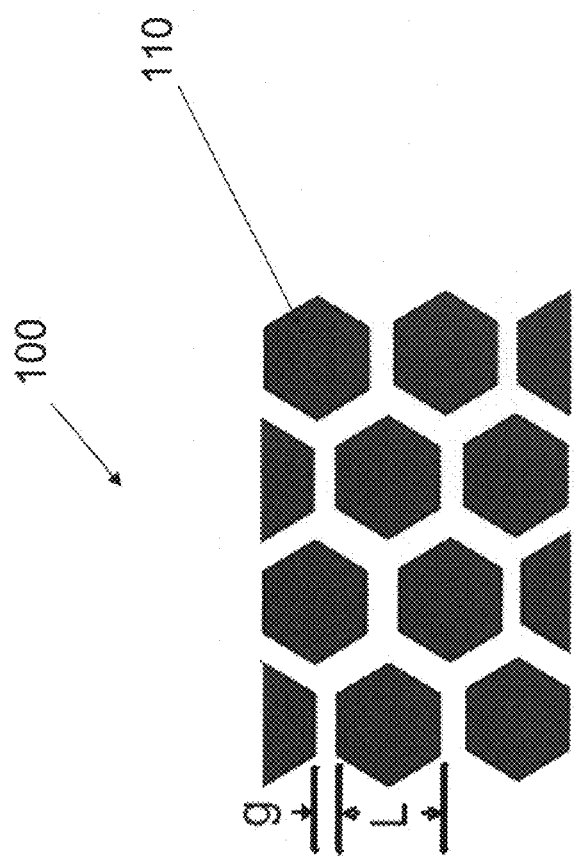
Figure 1C:
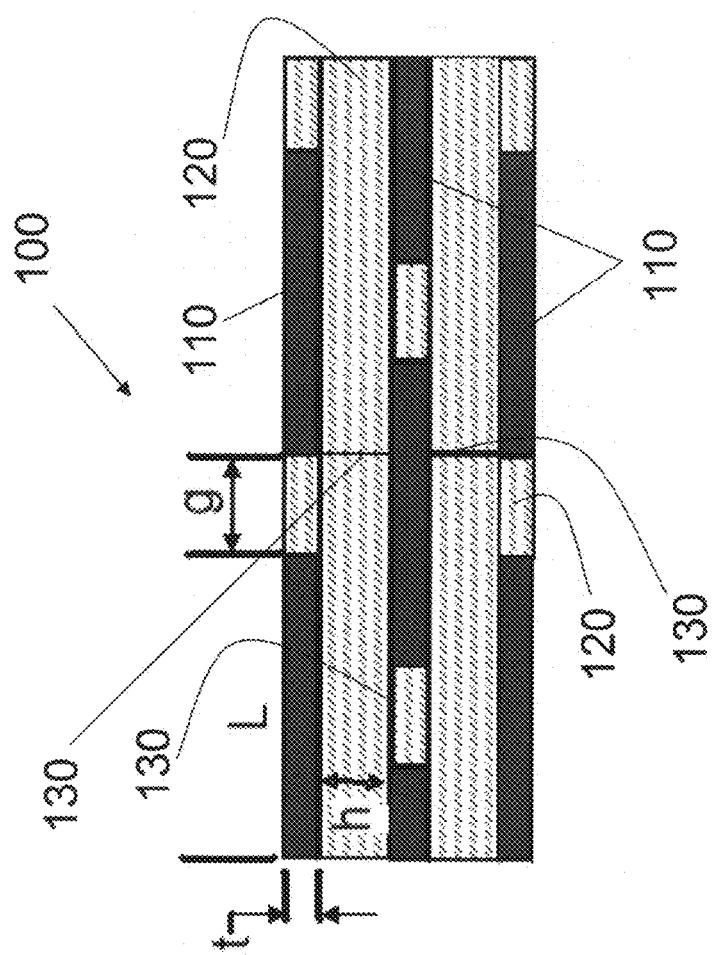

FIGS. 1a, 1b, and 1c respectively are a perspective view, a top plan view, and a cross-sectional view of a simplified illustration of an elastomeric composite 100 according to an embodiment of the present invention. As shown in FIGS. 1a, 1b, and 1c, the elastomeric composite 100 includes structural reinforcement elements 110 distributed (or laminated) in an elastic or elastomeric matrix 120 (see FIG. 1c). In one embodiment as shown in FIG. 1c, the structural reinforcement elements (or layers) 110 and the elastomeric matrix (or layers) 120 are arranged in alternating layers.

In the example elastomeric composite 100, the structural reinforcement elements 110 are shown to be composed of an array of reinforcement platelets of uniform size, shape and orientation that are distributed in the elastomeric matrix 120. However, the present invention is not thereby limited. For example, platelets can differ in size, shape and orientation from each other.

Here, in FIGS. 1a, 1b, and 1c, if the important geometric parameters, such as platelet thickness (t), and length or major dimension (L), planar distance between platelets (g) and polymer layer thickness (h), are known and controllable, the mechanical properties of the composite can be tailored to specific application requirements. For example, since the reinforcement elements 110 are a higher modulus, stiffer material than the elastomeric matrix 120, then the overall stiffness of the elastomeric composite 100 will increase as the ratio (t/h) increases, or as (g/L) decreases, as both of these cases result in a higher volume fraction of the stiffer material in the composite 100. As such, through suitable patterning, etching and layer assembly process, embodiments of the present invention have highly controlled planar layouts, spacing between platelets and through the thickness shown in FIGS. 1b and 1c. Here, in the context of embodiments of the present invention, the major dimension should refer to the longest dimension of each of the platelets. In addition, the major dimensions of the platelets (or rigid reinforcements) according to embodiments of the present invention are less than 1 cm. Also, referring to FIGS. 2a and 2b, there are shown how the spacing and rigid body kinematics occurs as the elastomeric composite 100 is stretched.

In addition, FIG. 1c illustrates the cross-section view of an idealized composite showing a representation of interconnecting ligaments or attachments 130. Here, as shown in FIG. 1c, the kinematics of rigid reinforcements (or reinforcement elements) 110 may be tailored to rotate or twist as well as stretch by adding the interconnecting ligaments or attachments 130. Applications that incorporate these concepts may require more specialized reinforcement and connectivity designs than illustrated in FIGS. 1a, 1b, 1c, 2a, and 2b.

Figure 3:
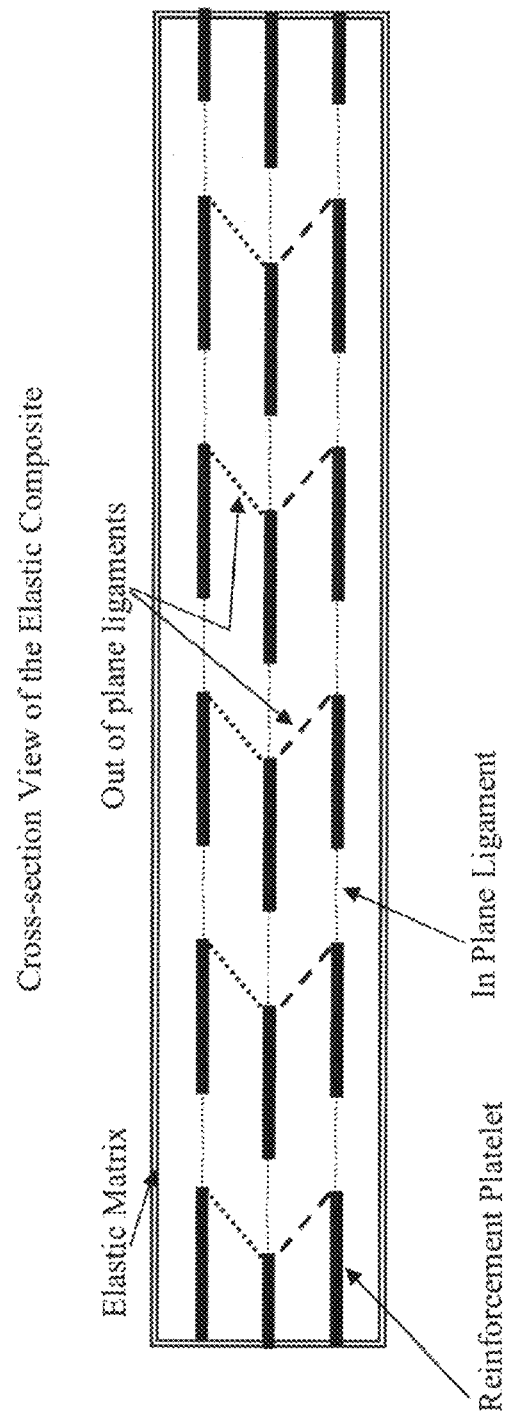
FIG. 3 illustrates a representation of an elastomeric composite's cross section according to an embodiment of the present invention.

In more detail, FIG. 3 shows a representation of an elastomeric composite's cross section according to an embodiment of the present invention. It depicts the elastic matrix as the double line box, the metallic reinforcement platelets as the heavy black lines and the ligaments connecting the platelets as the dotted lines. The different weight dotted lines represent an example of ligaments in different orientations. It is envisioned that the reinforcement layers can be cut, machined, chemically etched, stamped or built in with any solid building techniques (3D printing, selective laser sintering, etc.) and the technique used may be different depending on the size scale and/or application. In the case of etching, differential etching can be employed to make the ligaments or sections of the ligaments that are out of the platelet plane and then joined/bonded to another reinforcement layer utilizing various suitable joining/bonding techniques including but not limited to gluing, brazing, diffusion bonding, chemical vapor deposition, welding, etc.

Figure 4:
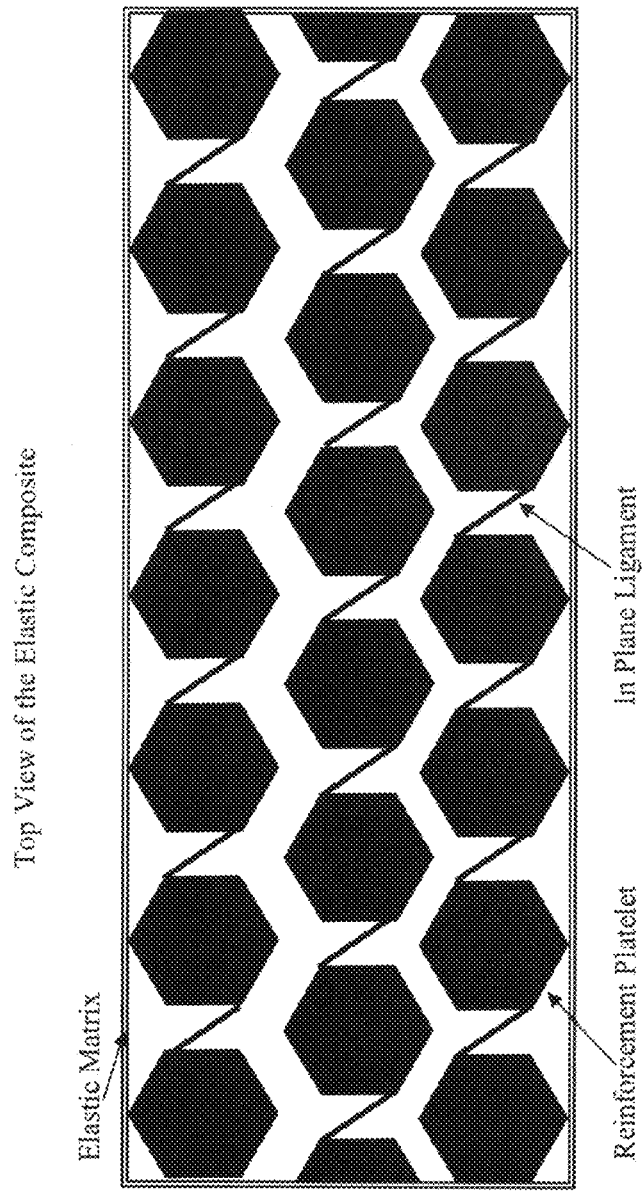
FIG. 4 illustrates a representation of the top view (planar view) of an elastomeric composite according to another embodiment of the present invention.

FIG. 4 shows a representation of the top view (planar view) of an elastomeric composite according to another embodiment of the present invention. It depicts the reinforcement platelets as having a hexagonal shape with ligaments connecting a first platelet to a second platelet. Here, the embodiment of FIG. 4 is a representation of the present invention and should not limit the shape of the platelets and the ligaments of the present invention. The platelets can be any arbitrary or suitable shape as required by an application as can the connectivity and deformation capability of the ligaments. For example, it may be desired in a given application to etch platelets of triangular geometry and the ligaments can be "U" or "S" shaped. Furthermore, the ligaments can connect any neighboring platelet in the same plane as the first platelet or out of plane as shown in FIG. 1c. It can also be envisioned that a group of platelets and ligaments can enclose a section of the elastic matrix. This enclosed area can be any arbitrary shape as required in the application. For example, one can imagine that a ligament can be made to bridge all straight sections (from mid-section to mid-section) on the hexagonal platelets and the resulting enclosed area resembles a "Y" shape. As aforementioned the enclosed area can be tailored as needed in the application and can include but is not limited to "bow tie", rectangular, triangular, etc. shaped areas. One skilled in the art will recognize the advantages of a "bow tie" shaped enclosed area as having a tailorable Poisson ratio as the composite is deformed. Tailorability of the Poisson ratio is one of the desired characteristics that this composite material will have over the traditional fiber reinforced composite materials.

Figure 5:
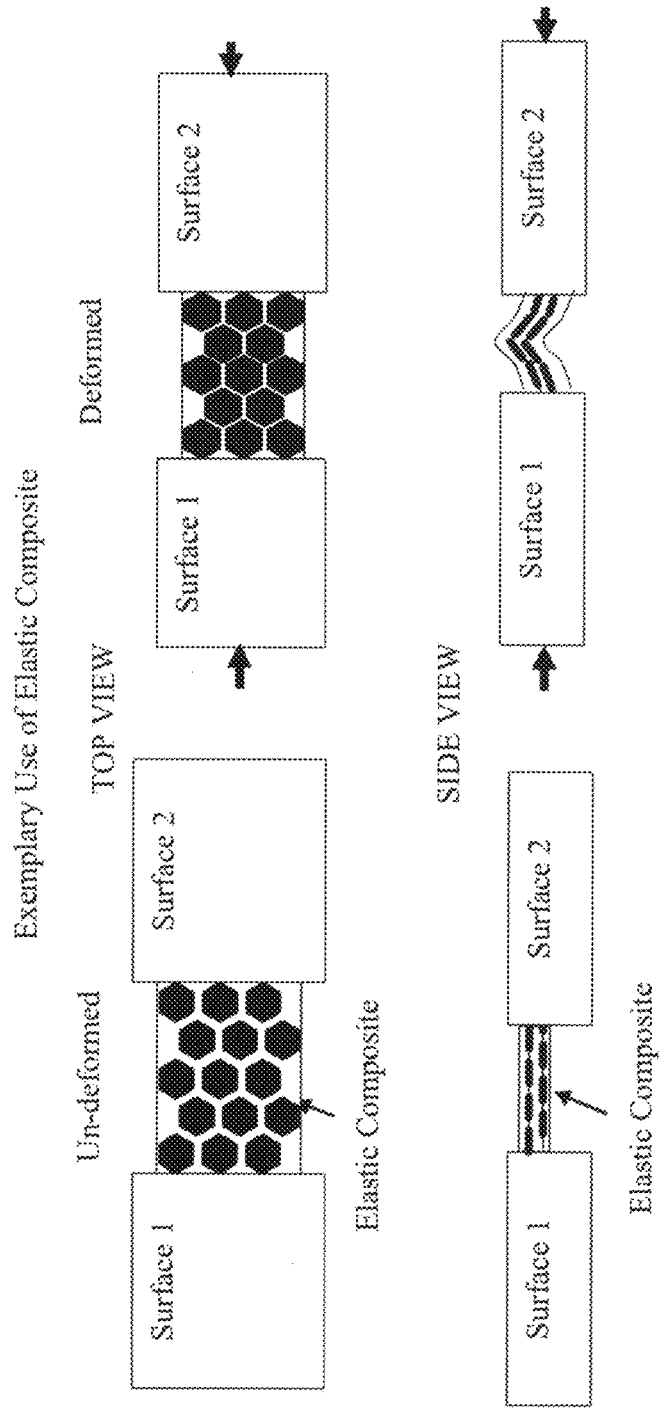
FIG. 5 illustrates one of the applications where an elastomeric composite according to an embodiment of the present invention bridges a gap between two surfaces (Surface 1, Surface 2).

FIG. 5 shows one of the applications where an elastomeric composite according to an embodiment of the present invention bridges a gap between two surfaces (Surface 1, Surface 2). As the surfaces are displaced, FIG. 5 shows the deformation of the composite. The composite allows deformations in at least one direction while still maintaining load bearing capabilities in at least one different direction. The continuity of the composite, reinforcement layers and elastomer matrix, is necessary to provide a load path from Surface 1 to Surface 2. This load path is established through the reinforcement layer as the elastic material is a conforming material and bears minimum load. In one embodiment of the present invention, the elastomeric material of the composite provides the following functionality (including but not limited to): (1) encapsulating the reinforcement material, (2) protecting the reinforcement material from harmful environments, (3) providing a barrier from one side to the other of the composite (impermeability) separating media, (4) providing some energy storage to aide in the reset of the composite to its un-deformed shape for deployment or stowage purposes, and/or (5) the reinforcement material and/or particle filled elastomer matrix providing desired electromagnetic properties.

Figure 6:
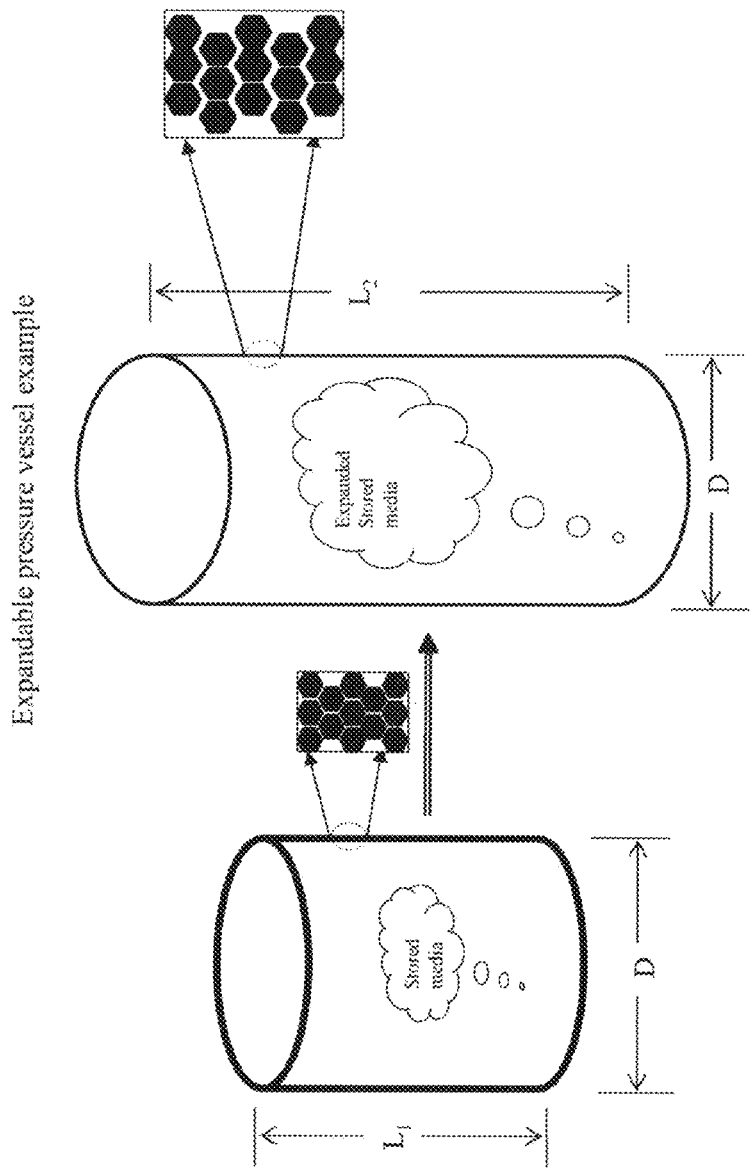
FIG. 6 illustrates an expandable pressure vessel composed of an elastomeric composite according to an embodiment of the present invention.
Figure 7:
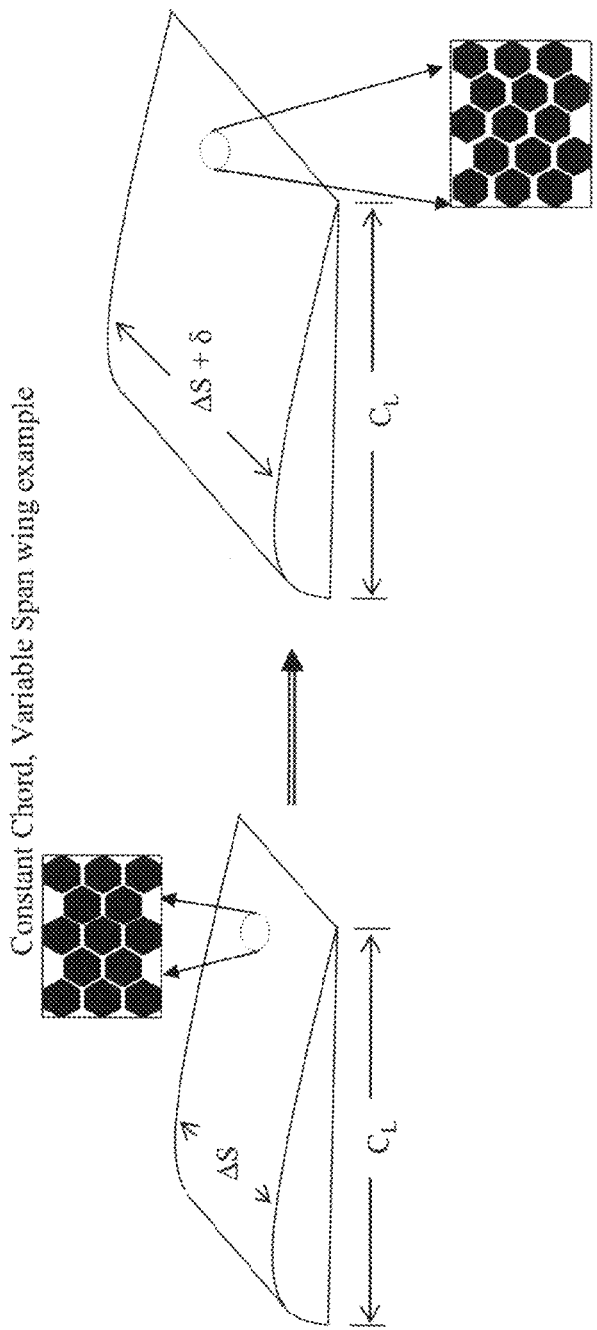
FIG. 7 illustrates a wing section of an elastomeric composite according to an embodiment of the present invention.

FIG. 6 shows an expandable pressure vessel composed of an elastomeric composite according to an embodiment of the present invention, and FIG. 7 shows a wing section of an elastomeric composite according to an embodiment of the present invention. Here, the pressure vessel of FIG. 6 and the wing section of FIG. 7 are examples of applications that require resistance to perpendicular pressures but can expend in one direction.

In more detail, FIG. 6 shows a pressure vessel constrained to a fixed diameter D, but having a variable length $L_1$, $L_2$, and FIG. 7 shows an airplane wing with a fixed chord length $C_L$, but having a variable span $\Delta S$, $\Delta S+\delta$. That is, as shown in FIG. 6, the hexagon reinforcements can be spaced more apart in one direction (e.g., the length direction) than in another direction (e.g., the diameter direction; and, as shown in FIG. 7, the hexagon reinforcements can be spaced more apart in the direction of the wing span than in the direction of the cord length.

Figure 8C:
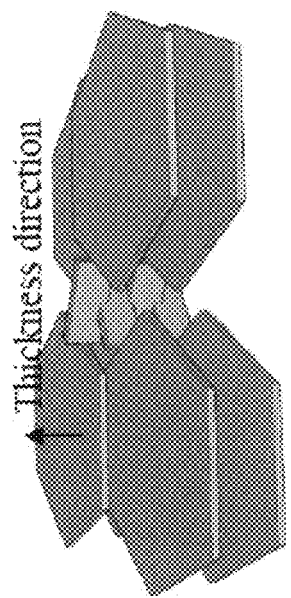
FIGS. 8*a*, 8*b*, and 8*c* illustrate various exemplary geometries for attaching space reinforcements relative to each other through the thickness direction in elastomeric composites.
Figure 8B:
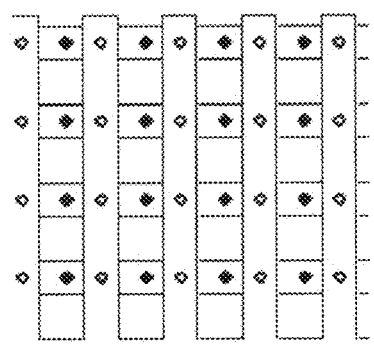
Figure 8A:
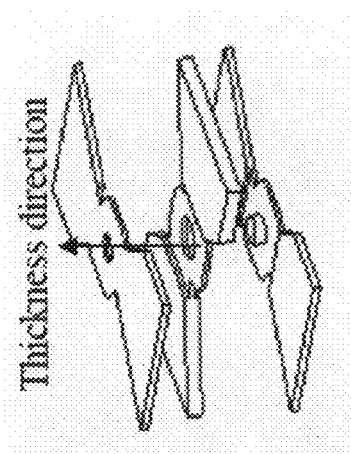

FIGS. 8a, 8b, and 8c show various exemplary geometries for attaching reinforcements relative to each other through the thickness direction in eleastomeric composites.

Specifically, FIG. 8a is a view where the reinforcements are press-fitted together and/or mounted to each other with a pin on one of the reinforcements inserted into holes of the other reinforcements.

Referring now to FIG. 8b, the various reinforcements are shown to be strips that are attached to each other with pins or rivets.

FIG. 8c is a view where the reinforcements are slot fitted together.

Figure 9B:
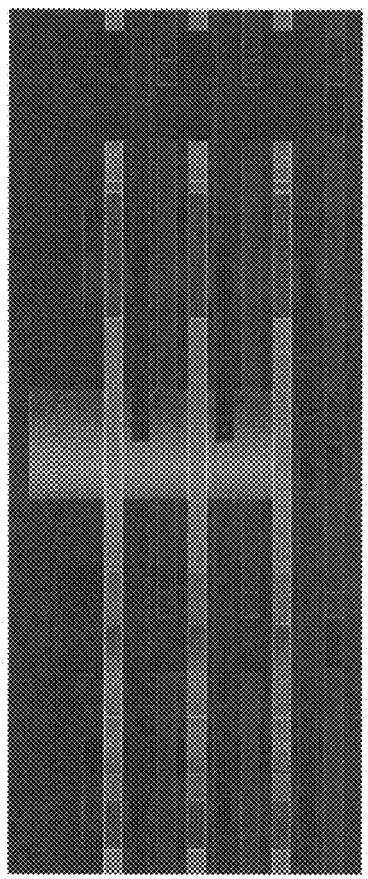
FIGS. 9*a* and 9*b* illustrate an additional example of geometries for attaching the space reinforcements relative to each other through the thickness direction.
Figure 9A:
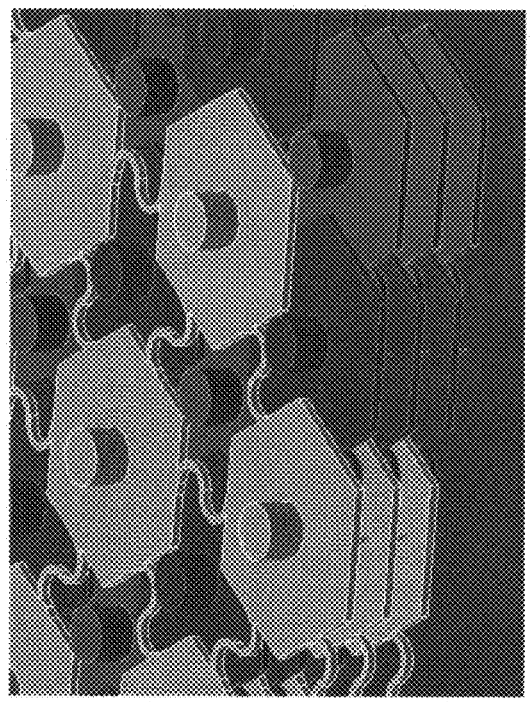

FIGS. 9a and 9b illustrate an additional example of geometries for attaching the space reinforcements relative to each other through the thickness direction. Here, FIG. 9a is an illustration showing an isometric view for stacking the various reinforcements together via through-thickness press inserts and in plane ligaments, and FIG. 9b is a through-thickness view of the embodiment of FIG. 9a.

FIGS. 10a and 10b illustrate that suitable slots and pins may be used to cause directional anisotropic deformation. The differently colored hexagons in FIGS. 10a and 10b represent three (3) different registrations through the composite thickness of an elastomeric composite according to an embodiment of the present invention. Here, in FIGS. 10a and 10b, the ovals represent etched slots in the similarly colored reinforcement geometries. Black dots are pins that fit in the slots, and the desired deformations occur in the direction of the slots. That is, the horizontally translated reinforcements of FIG. 10a and the nominal, fabricated position of FIG. 10b illustrate or represent two positions of the three colored layers with respect to each other.

Figure 12:
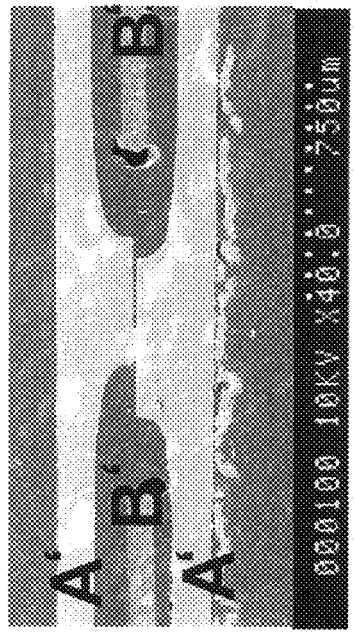
FIGS. 11 and 12 are views for illustrating the capability of embodiments of the present invention to join reinforcement through the thickness.
Figure 11:
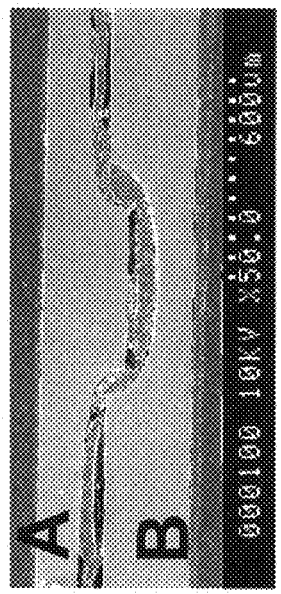

FIGS. 11 and 12 are cross-section scanning electron microscope views for illustrating the capability of embodiments of the present invention to join reinforcement through the thickness. That is, FIG. 11 shows a pin joint for mounting reinforcements A and B to each other, and FIG. 12 shows a three-dimensional (3D) interlocking joint for mounting reinforcements A', B', and A' to each other.

In view of the foregoing, one embodiment of the present invention is directed to an elastomeric composite having a composite reversible strain limit capability that is greater (>) than 3%.

One embodiment of the present invention is directed to an elastomeric composite having a highly controlled connectivity in-plane and between layers of reinforcements due to 3D etching capability.

One embodiment of the present invention is directed to an elastomeric composite with reinforcement connectivity tailored for anisotropic deformation in-plane or out-of-plane that is greater than 3 percent (%) strain for the elastomeric composite.

In one embodiment, the use of elastic or elastomeric matrices may be formed from one or more materials—e.g. from a shape memory polymer (SMP) and an elastomer or two elastomers.

One embodiment of the present invention is directed to an elastomeric composite that is impermeable and/or continuous.

In one embodiment of the present invention, the elastomeric composite is a highly elastic composite with spatial and depth control of electromagnetic response.

One embodiment of the present invention is an elastomeric composite with multifunctional capability that is realized with composite deformation, such as electromagnetic conductivity.

In more detail, referring to FIG. 1c, an elastomeric composite 100 according to an embodiment of the present invention includes an elastomeric matrix 120, a plurality of rigid reinforcements 110 with major dimensions less than 1 cm and embedded within the elastomeric matrix 120, and a plurality of attachments (or ligaments) 130 connected to the reinforcements 110 to interconnect the rigid reinforcements 110 to each other. Here, in this embodiment, the elastomeric composite 100 has a composite strain greater than 3 percent (%) due to kinematics of the rigid reinforcements 110 interconnected by the attachments 130 and embedded within the elastomeric matrix 120.

In one embodiment, the elastic composite reversible strain limit is greater than three (3) percent (%) due to the kinematics of the rigid reinforcements 110 interconnected by the attachments 130 and embedded within the elastomeric matrix 120.

In one embodiment, the elastomeric composite 100 is configured by the interconnected rigid reinforcements embedded within the elastomeric matrix to have a controlled connectivity in-plane and between layers of the rigid reinforcements 110.

In one embodiment, the attachments 130 and the rigid reinforcements 110 are connected in three dimensions.

In one embodiment, the elastomeric composite 100 is configured by the interconnected rigid reinforcements 110 embedded within the elastomeric matrix 120 for in-plane anisotropic deformation greater than 3 percent (%) strain for the elastomeric composite 100.

In one embodiment, the elastomeric composite 100 is configured by the interconnected rigid reinforcements 110 embedded within the elastomeric matrix 120 for out-of-plane anisotropic deformation greater than 3 percent (%) strain for the elastomeric composite 100.

In one embodiment, the elastomeric matrix 120 is composed of a single elastomer.

In one embodiment, the elastomeric matrix 120 is composed of a first elastomer and a second elastomer differing from the first elastomer.

In one embodiment, the elastomeric matrix 120 is composed of an elastomer and a shape memory polymer (SMP).

In one embodiment, the elastomeric composite 100 is an impermeable composite.

In one embodiment, the elastomeric composite 100 is configured by the interconnected rigid reinforcements 110 embedded within the elastomeric matrix 120 to have spatial and depth control of structural responses.

In one embodiment, the rigid reinforcements 110 interconnected by the attachments 130 and embedded within the elastomeric matrix 120 are configured to have a shape of a pressure vessel (see, e.g., FIG. 6) or an aeronautical wing (see, e.g., FIG. 7).

In one embodiment, the attachments 130 and the reinforcements 110 are composed of a constant stiffness material.

In one embodiment, the rigid reinforcements 110 and the attachments 130 are cut, etched or stamped out of a structural material.

In one embodiment, the rigid reinforcements 110 and the attachment 130 are composed of transition metal or metal alloy. Here, the metal or metal alloy may be selected from the group consisting of aluminum, steel, titanium, nickel, cobalt, copper brass, bronze, magnesium and combinations thereof.

Referring to FIG. 1c, an elastomeric composite 100 according to another embodiment of the present invention includes a plurality of rigid reinforcement layers and a plurality of elastomeric layers arranged in alternating layers with the plurality of rigid reinforcement layers. Each of the rigid reinforcement layers includes an elastomeric material 120, a plurality of rigid reinforcements 110 embedded in the elastomeric material 120, and a plurality of in-plane attachments 130 to interconnect the rigid reinforcements 110 (see, e.g., FIG. 4). Each of the elastomeric layers includes the elastomeric material 120 and a plurality of out-of-plane attachments 130. The out-of-plane attachments 130 interconnect the rigid reinforcements 110 of the plurality of rigid reinforcement layers to each other (see, e.g., FIG. 3).

In one embodiment, the in-plane and out-of-plane attachments 130 and the reinforcements 110 are composed of a constant stiffness material.

In one embodiment, the elastomeric composite 100 has a composite reversible strain limit of greater than three percent (3%) due to kinematics of the rigid reinforcements 110 interconnected by the in-plane and out-of-plane attachments 130 and embedded within the elastomeric material 120.

In one embodiment, the rigid reinforcements 110 in each of the rigid reinforcement layers are reinforcement platelets cut, etched or stamped out of a structural sheet or foil.

In one embodiment, the rigid reinforcements 110 and the in-plane and out-of-plane attachment 130 are composed of metal or metal alloy.

In one embodiment, the elastomeric material 120 is a natural and/or synthetic rubber material.

In one embodiment, the elastomeric material 120 has a constant elastic stiffness rather than variable elastic stiffness. The elastomeric material may be a non-variable modulus material (i.e., always flexible and stretchable at the deformation temperature with a constant modulus) or variable modulus material. Suitable non-limiting exemplary non-variable modulus material includes members of the elastomer family of amorphous polymers used at least 20 degrees Celsius above their glass transition temperature. Examples include Natural Rubber (NR), Synthetic Polyisoprene (IR), Butyl rubber (copolymer of isobutylene and isoprene, IIR), Halogenated butyl rubbers (Chloro-butyl Rubber: CIIR; Bromobutyl Rubber: BIIR), Polybutadiene (BR), Styrene-butadiene Rubber (copolymer of polystyrene and polybutadiene, SBR), Nitrile Rubber (copolymer of polybutadiene and acrylonitrile, NBR), also called Buna N rubbers, Hydrogenated Nitrile Rubbers (HNBR) Therban and Zetpol, Chloroprene Rubber (CR), polychloroprene, Neoprene, Baypren, EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM), Tecnoflon PFR, Kalrez, Chemraz, Perlast, Polyether Block Amides (PEBA), Chlorosulfonated Polyethylene (CSM), (Hypalon), Ethylene-vinyl acetate (EVA), Thermoplastic elastomers (TPE), and Thermoplastic Vulmayizates (TPV), for example Santoprene TPV, Thermoplastic Polyurethane (TPU), Thermoplastic Olefins (TPO).

While certain exemplary embodiments have been described in detail and shown in the accompanying drawings, it is to be understood that such embodiments are merely illustrative of and not restrictive of the broad invention. It will thus be recognized by a person skilled in the art that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims and equivalents thereof.

What is claimed is:

1. An elastomeric composite comprising:
    an elastomeric matrix;
    a plurality of rigid reinforcements with major dimensions less than 1 cm and embedded within the elastomeric matrix; and
    a plurality of attachments connected to the reinforcements to interconnect the rigid reinforcements to each other,
    wherein the elastomeric composite has a composite reversible strain limit greater than three (3) percent (%) due to kinematics of the rigid reinforcements interconnected by the attachments and embedded within the elastomeric matrix.

2. The elastomeric composite of claim 1, wherein the elastic composite reversible strain limit is greater than five (5)

percent (%) due to the kinematics of the rigid reinforcements interconnected by the attachments and embedded within the elastomeric matrix.

3. The elastomeric composite of claim 1, wherein the elastomeric composite is configured by the interconnected rigid reinforcements embedded within the elastomeric matrix to have a controlled connectivity in-plane and between layers of the rigid reinforcements.

4. The elastomeric composite of claim 3, wherein the attachments and the rigid reinforcements are connected in three orthogonal directions.

5. The elastomeric composite of claim 1, wherein the elastomeric composite is configured by the interconnected rigid reinforcements embedded within the elastomeric matrix for an in-plane reversible anisotropic deformation limit greater than 2 percent (%) strain of the elastomeric composite.

6. The elastomeric composite of claim 1, wherein the elastomeric composite is configured by the interconnected rigid reinforcements embedded within the elastomeric matrix for an out-of-plane anisotropic deformation limit greater than 2 percent (%) strain of the elastomeric composite.

7. The elastomeric composite of claim 1, wherein the elastomeric matrix is composed of a single elastomer.

8. The elastomeric composite of claim 1, wherein the elastomeric matrix is composed of a first elastomer and a second elastomer differing from the first elastomer.

9. The elastomeric composite of claim 1, wherein the elastomeric matrix is composed of an elastomer and a shape memory polymer (SMP).

10. The elastomeric composite of claim 1, wherein the elastomeric composite is an impermeable composite.

11. The elastomeric composite of claim 1, wherein the elastomeric composite is configured by the interconnected rigid reinforcements embedded within the elastomeric matrix to have spatial and depth control of structural responses.

12. The elastomeric composite of claim 1, wherein the rigid reinforcements interconnected by the attachments and embedded within the elastomeric matrix are configured to have a shape of a pressure vessel or an aeronautical wing.

13. The elastomeric composite of claim 1, wherein the attachments and the reinforcements are composed of a constant stiffness material.

14. The elastomeric composite of claim 1, wherein the reinforcements and the attachment shapes are composed of metal or metal alloy.

15. The elastomeric composite of claim 14, wherein, the metal or metal alloy is selected from the group consisting of aluminum, steel, titanium, nickel, cobalt, copper brass, bronze, magnesium and combinations thereof.

16. The elastomeric composite of claim 1, wherein the elastomeric matrix has a Poisson ratio between 0.45 and 0.5, a modulus of elasticity between 460 KPa and 300 MPa, and a glass transition temperature at least 20 degrees Celsius below the composite deformation temperature.

17. An elastomeric composite comprising:
  a plurality of rigid reinforcement layers, each of the rigid reinforcement layers comprising an elastomeric material, a plurality of rigid reinforcements embedded in the elastomeric material, and a plurality of in-plane attachments to interconnect the rigid reinforcements;
  a plurality of elastomeric layers arranged in alternating layers with the plurality of rigid reinforcement layers, each of the elastomeric layers comprising the elastomeric material and a plurality of out-of-plane attachments,
  wherein the out-of-plane attachments interconnect the rigid reinforcements of the plurality of rigid reinforcement layers to each other.

18. The elastomeric composite of claim 17, wherein the in-plane and out-of-plane attachments and the reinforcements are composed of a constant stiffness material.

19. The elastomeric composite of claim 17, wherein the elastomeric composite has a composite reversible strain limit of greater than three percent (3%) due to kinematics of the rigid reinforcements interconnected by the in-plane and out-of-plane attachments and embedded within the elastomeric material.

20. The elastomeric composite of claim 17, wherein the rigid reinforcements and the in-plane and out-of-plane attachment are composed of metal or metal alloy.

21. The elastomeric composite of claim 20, wherein, the metal or metal alloy is selected from the group consisting of aluminum, steel, titanium, nickel, cobalt, copper brass, bronze, magnesium and combinations thereof.

22. The elastomeric composite of claim 17, wherein the elastomeric material is a natural and/or synthetic rubber material.

23. The elastomeric composite of claim 17, wherein the elastomeric material has a Poisson ratio between 0.45 and 0.5, a modulus of elasticity between 460 KPa and 300 MPa, and a glass transition temperature at least 20 degrees Celsius below the composite deformation temperature.

* * * * *